United States Patent
Sota et al.

(10) Patent No.: US 11,069,049 B2
(45) Date of Patent: Jul. 20, 2021

(54) DIVISION LINE DETECTION DEVICE AND DIVISION LINE DETECTION METHOD

(71) Applicants: TOYOTA JIDOSHA KABUSHIKI KAISHA, Toyota (JP); DENSO CORPORATION, Aichi-pref (JP)

(72) Inventors: Takahiro Sota, Yokohama (JP); Jia Sun, Tokyo-to (JP); Masataka Yokota, Tokyo-to (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 105 days.

(21) Appl. No.: 16/655,978

(22) Filed: Oct. 17, 2019

(65) Prior Publication Data

US 2020/0151865 A1     May 14, 2020

(30) Foreign Application Priority Data

Nov. 9, 2018    (JP) .............................. JP2018-211260

(51) Int. Cl.
    *G06K 9/00*       (2006.01)
    *G06T 7/00*        (2017.01)
    *G06K 9/03*       (2006.01)

(52) U.S. Cl.
    CPC ........ *G06T 7/0002* (2013.01); *G06K 9/00798* (2013.01); *G06K 9/03* (2013.01); *G06T 2207/30256* (2013.01)

(58) Field of Classification Search
None
See application file for complete search history.

(56) References Cited

U.S. PATENT DOCUMENTS

| | | | | |
|---|---|---|---|---|
| 7,646,890 | B2* | 1/2010 | Kobayashi | G06K 9/00798 382/106 |
| 9,081,385 | B1* | 7/2015 | Ferguson | G05D 1/0246 |
| 10,127,460 | B2* | 11/2018 | Okada | G06K 9/6277 |
| 2006/0239509 | A1* | 10/2006 | Saito | G06K 9/6205 382/104 |
| 2008/0027627 | A1* | 1/2008 | Ikeda | G08G 1/167 701/117 |
| 2017/0122762 | A1* | 5/2017 | van der Molen | G01C 21/32 |
| 2019/0130182 | A1* | 5/2019 | Zang | G06K 9/00651 |
| 2019/0205665 | A1* | 7/2019 | Duan | G06K 9/00798 |

FOREIGN PATENT DOCUMENTS

| | | |
|---|---|---|
| JP | 2003-308534 A | 10/2003 |
| JP | 2004-246641 A | 9/2004 |

\* cited by examiner

*Primary Examiner* — Carol Wang
(74) *Attorney, Agent, or Firm* — Sughrue Mion, PLLC

(57) ABSTRACT

A division line detection device includes: a processor configured to detect a division line candidate pixel from an image acquired by a camera mounted on a vehicle, set first reliability for a division line candidate pixel whose value representing likelihood that a lane division line is represented is equal to or more than a predetermined threshold value; set second reliability lower than the first reliability for a division line candidate pixel whose value is less than the predetermined threshold value; correct to the first reliability, when a first predetermined number or more of the division line candidate pixels are located on a first scan line having one end at a vanishing point of the image, the second reliability of each division line candidate pixel on the first scan line; and detect a lane division line based on the division line candidate pixels having the first reliability.

5 Claims, 5 Drawing Sheets

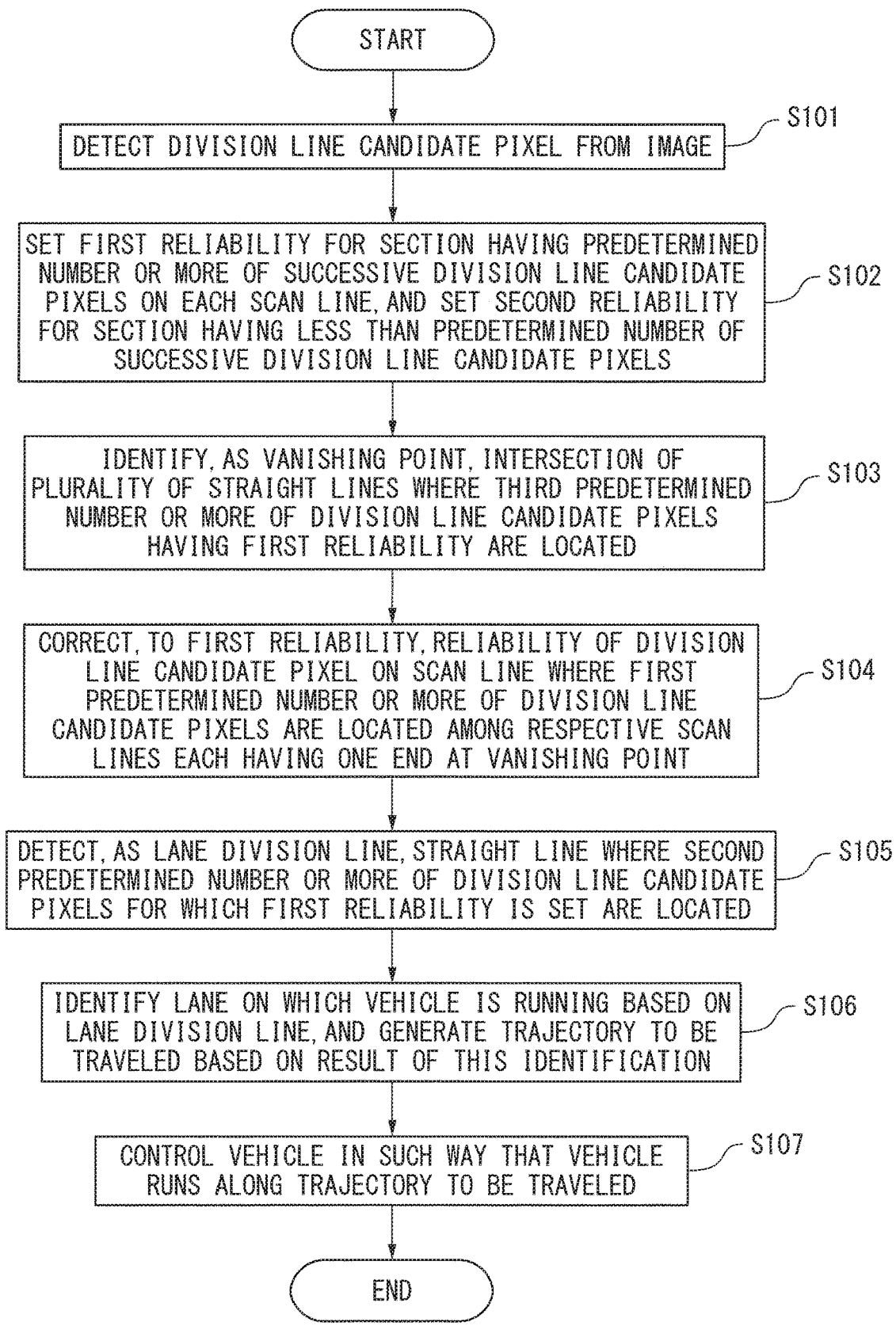

DIVISION LINE DETECTION DEVICE AND DIVISION LINE DETECTION METHOD

FIELD

The present invention relates to a division line detection device and a division line detection method that detect a division line of a lane marked on a road.

BACKGROUND

In driving support or automatic driving control of vehicles, there has been proposed a technique for detecting, in order to identify a lane on which a vehicle is running, a lane division line marked on a road (i.e., lane marking) from an image acquired by photography with a camera mounted on the vehicle (e.g., refer to Japanese Unexamined Patent Publication (Kokai) No. 2003-308534 and Japanese Unexamined Patent Publication (Kokai) No. 2004-246641).

For example, a white line recognition device described in Japanese Unexamined Patent Publication (Kokai) No. 2003-308534 laterally scans an image of a road surface ahead of a vehicle at each longitudinal position of the road surface image, and then extracts a bright part resulting from a white line by detecting a pair edge composed of an up-edge in which brightness rises and a down-edge in which brightness falls. When a plurality of obtained pair edges are arranged, the white line recognition device determines a white line candidate point as a point for taking a relative position for the plurality of pair edges on the basis of the arrangement, in such a way that, even in a road part in which a plurality of white lines are arranged, a white line candidate point that can be obtained if the road part is a road part having a single white line can be obtained.

A road white line recognition device described in Japanese Unexamined Patent Publication (Kokai) No. 2004-246641 detects a white line candidate line composed of a negative edge point row, obtains an intersection of the white line candidate line and a horizontal line, and thereby detects position coordinates of a virtual vanishing point of the white line candidate line. The road white line recognition device scans predetermined ranges of the white line candidate line inside a lane and outside the lane with a scan line having the virtual vanishing point as an origin, calculates a total luminance value of pixels opposed to the scan line at each scan line position, and detects a change status of the total luminance value resulting from a change of the scan line position. In a case where the scan line position changes from the inside of the lane toward the outside of the lane, the road white line recognition device determines that this white line candidate line is a road white line candidate corresponding to a road white line when the total luminance value changes in the following order of states: a state where the total luminance value is lower than a road surface threshold value, a state where the total luminance value is higher than a white line threshold value, and a state where the total luminance value is lower than the road surface threshold value.

SUMMARY

However, a lane division line may appear small depending on a position on an image at which the lane division line is represented, and therefore, it may become difficult to detect a luminance change or an edge in a direction crossing the lane division line. Particularly, when a wide-angle camera is mounted on a vehicle in such a way that a wide range around the vehicle is photographed, a road division line located on periphery of an image appears significantly small. As a result, there is concern that the lane division line may be unsuccessfully detected.

Therefore, an object of the present invention is to provide a division line detection device capable of improving accuracy in detection of a lane division line marked on a road.

According to one embodiment, a division line detection device is provided. The division line detection device includes: a processor configured to detect a division line candidate pixel having a possibility of representing a lane division line from an image acquired by a camera mounted on a vehicle; set first reliability for a division line candidate pixel in which a value representing likelihood that a lane division line is represented is equal to or more than a predetermined threshold value among detected division line candidate pixels, set second reliability lower than the first reliability for a division line candidate pixel in which the value is less than the predetermined threshold value; correct to the first reliability, when a first predetermined number or more of the division line candidate pixels are located on a first scan line having one end at a vanishing point of the image, reliability of the division line candidate pixel on the first scan line for which the second reliability is set; and detect, as a lane division line, a straight line where a second predetermined number or more of the division line candidate pixels for which the first reliability is set are located.

In the division line detection device, it is preferable that, for each of a plurality of second scan lines set along a direction assumed to cross the lane division line on the image, the processor calculates a number of the successive division line candidate pixels along the second scan line, as the value representing likelihood that a lane division line is represented for a set of the successive division line candidate pixels.

Furthermore, it is preferable that the processor is further configured to detect a plurality of straight lines where a third predetermined number or more of the division line candidate pixels which are detected by the processor and for which the first reliability is set are located, and determine, as the vanishing point, an intersection of the plurality of detected straight lines.

In this case, it is preferable that the processor detects a plurality of straight lines where the third predetermined number or more of the division line candidate pixels which are detected by the processor and for which the first reliability is set are located, and determine, as the vanishing point regarding the image, an average of an intersection of the plurality of detected straight lines, and a vanishing point detected with regard to another image acquired by the camera before the image.

According to another embodiment, a division line detection method is provided. The division line detection method includes: detecting a division line candidate pixel having a possibility of representing a lane division line from an image acquired by a camera mounted on a vehicle; setting first reliability for a division line candidate pixel in which a value representing likelihood that a lane division line is represented is equal to or more than a predetermined threshold value among detected division line candidate pixels; setting second reliability lower than the first reliability for a division line candidate pixel in which the value is less than the predetermined threshold value; when a first predetermined number or more of the division line candidate pixels are located on a first scan line having one end at a vanishing point of the image, correcting, to the first reliability, reliability of the division line candidate pixel on the first scan line for which the second reliability is set; and detecting, as a lane division line, a straight line where a second predetermined number or more of the division line candidate pixels for which the first reliability is set are located.

A division line detection device according to the present invention provides an advantageous effect of being able to improve accuracy in detection of a lane division line marked on a road.

BRIEF DESCRIPTION OF DRAWINGS

FIG. 5 is an operation flowchart of the vehicle control process including the division line detection process.

DESCRIPTION OF EMBODIMENTS

A division line detection device will be described below with reference to the drawings. The division line detection device detects a lane division line marked on a road from an image acquired by a camera mounted on a vehicle and representing periphery of the vehicle. The division line detection device detects a pixel (hereinafter, referred to as a division line candidate pixel) having a possibility of representing a lane division line by inputting the image to a classifier, sets reliability representing likelihood of being a lane division line to relatively high first reliability for a section having a predetermined number or more of successive division line candidate pixels when scanning along a scan line in a predetermined direction (e.g., a horizontal direction) assumed to cross a lane division line on the image, and sets, on the other hand, the reliability to relatively low second reliability for a section whose number of successive division line candidate pixels is less than the predetermined number. The division line detection device detects a plurality of straight lines where a third predetermined number or more of division line candidate pixels for which the first reliability is set are located, and determines an intersection of the straight lines as a vanishing point on the image. With regard to each of a plurality of scan lines having one end at the vanishing point and set radially from the vanishing point, when a first predetermined number or more of division line candidate pixels are located on the scan line, the division line detection device corrects, to the first reliability, reliability of a division line candidate pixel which is located on the scan line and for which the second reliability is set. The division line detection device detects, as a lane division line, a straight line where a second predetermined number or more of the division line candidate pixels for which the first reliability is set are located.

An example in which a division line detection device is applied to a vehicle control system is described below. In this example, a division line detection device detects a vehicle division line by executing a division line detection process for an image acquired by a camera mounted on a vehicle, and utilizes the detected lane division line for driving control of the vehicle.

Figure 1:
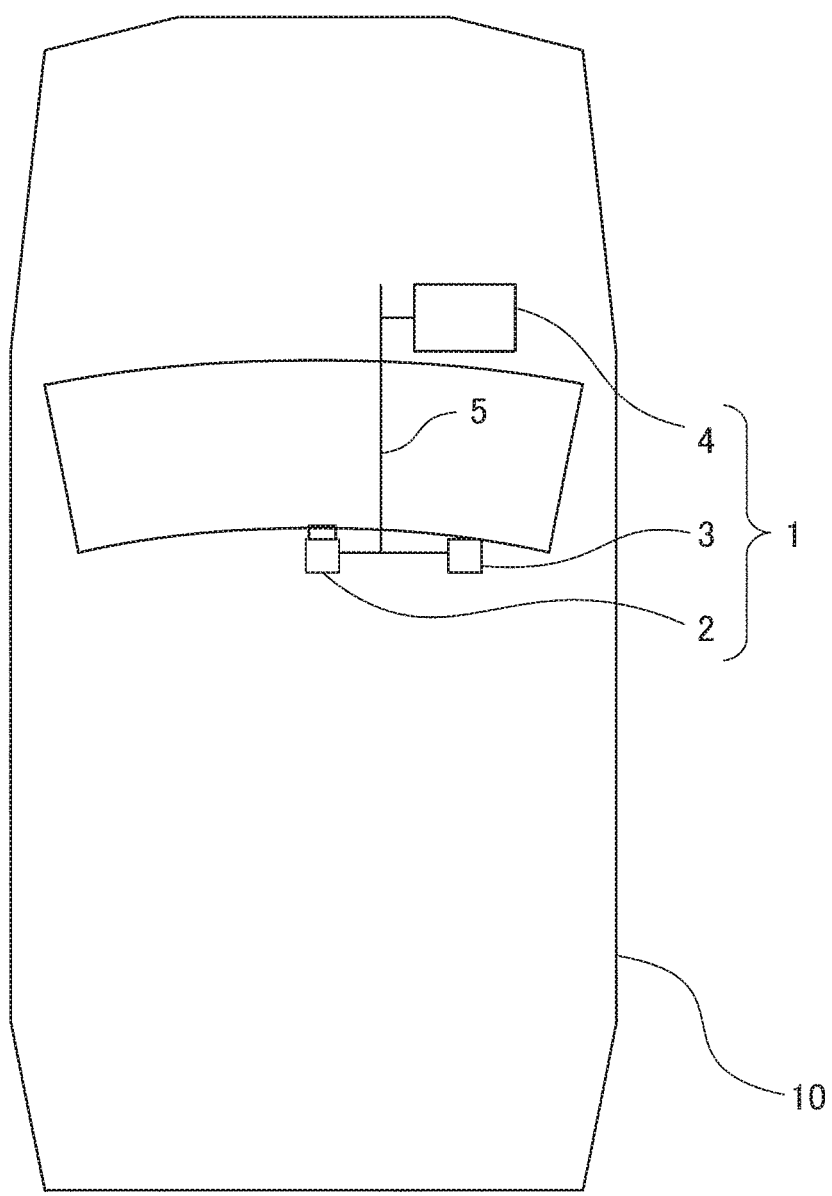
FIG. 1 is a schematic configuration diagram of a vehicle control system on which a division line detection device is installed.
Figure 2:
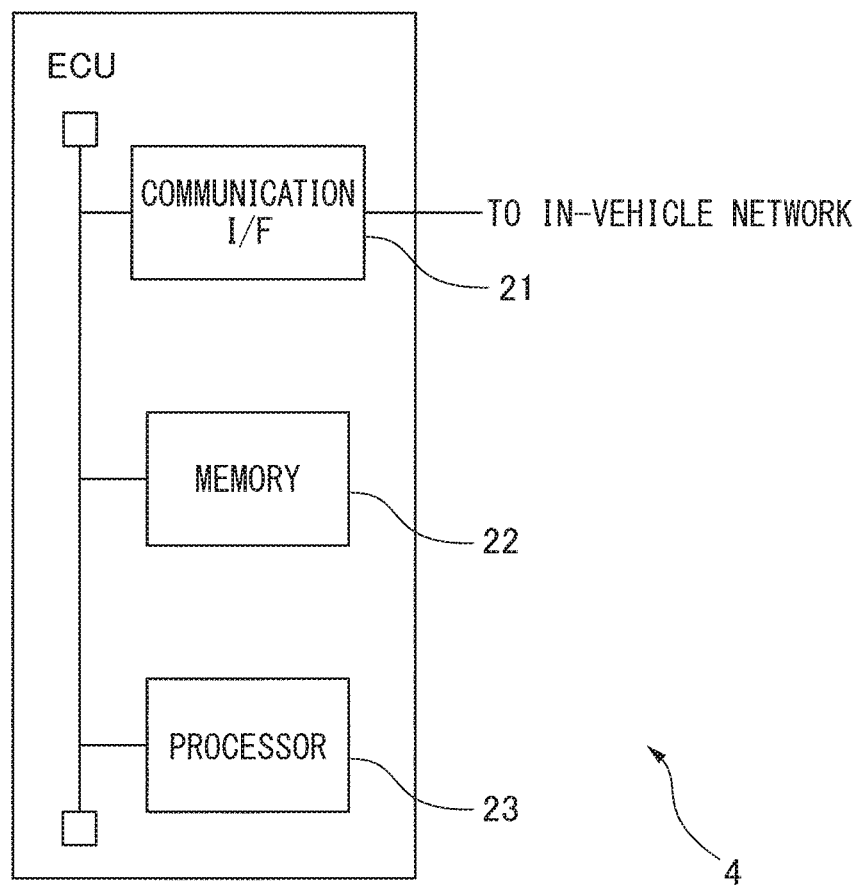
FIG. 2 is a hardware configuration diagram of an electronic control unit that is one embodiment of a division line detection device.

FIG. 1 is a schematic configuration diagram of a vehicle control system on which a division line detection device is installed. FIG. 2 is a hardware configuration diagram of an electronic control unit that is one embodiment of a division line detection device. In the present embodiment, a vehicle control system 1 which is installed on a vehicle 10 and controls the vehicle 10 includes a camera 2 for imaging the surroundings of the vehicle 10, a positioning information receiver 3, and an electronic control unit (ECU) 4 that is one example of a division line detection device. The camera 2, the positioning information receiver 3, and the ECU 4 are communicably connected to one another via an in-vehicle network 5 compliant with a standard such as a controller area network.

The camera 2 is one example of an imaging unit, and includes a two-dimensional detector composed of an array of photoelectric conversion elements sensitive to visible light such as a CCD image sensor or a C-MOS image sensor, and an imaging optical system which forms an image of a region targeted for photography on the two-dimensional detector. The camera 2 is attached, for example, inside a vehicle room of the vehicle 10 in such a way that it is oriented in the front direction of the vehicle 10. The camera 2 images a forward region of the vehicle 10 every predetermined photography period (e.g., 1/30 seconds to 1/10 seconds), and generates an image representing the forward region. An image generated by the camera 2 may be a color image or a gray image.

Each time the camera 2 generates an image, the camera 2 outputs the generated image to the ECU 4 via the in-vehicle network 5.

The positioning information receiver 3 is one example of a positioning unit, and acquires positioning information representing a current position of the vehicle 10. For example, the positioning information receiver 3 may be a GPS receiver. Each time the positioning information receiver 3 acquires positioning information, the positioning information receiver 3 outputs the acquired positioning information to the ECU 4 via the in-vehicle network 5.

The ECU 4 controls the vehicle 10. In the present embodiment, the ECU 4 controls the vehicle 10 in such a way as to automatically drive the vehicle 10 on the basis of a lane division line detected from an image acquired by the camera 2. Thus, the ECU 4 includes a communication interface 21, a memory 22, and a processor 23.

The communication interface 21 is one example of a communication unit, and includes an interface circuit for connecting the ECU 4 to the in-vehicle network 5. In other words, the communication interface 21 is connected to the camera 2 and the positioning information receiver 3 via the in-vehicle network 5. Each time the communication interface 21 receives an image from the camera 2, the communication interface 21 transfers the received image to the processor 23. Each time the communication interface 21 receives positioning information from the positioning information receiver 3, the communication interface 21 transfers the received positioning information to the processor 23.

The memory 22 is one example of a storage unit, and includes, for example, a volatile semiconductor memory and a non-volatile semiconductor memory. The memory 22 stores various data used in a division line detection process executed by the processor 23 of the ECU 4, for example, an image received from the camera 2, various parameters for identifying a classifier utilized in the division line detection process, and the like. Further, the memory 22 may store map information. The map information includes information representing a number of lanes set on a road.

The processor 23 is one example of a control unit, and includes one or a plurality of CPUs (Central Processing Units) and peripheral circuits thereof. The processor 23 may further include another arithmetic circuit such as a logical arithmetic unit, a numerical arithmetic unit, or a graphic processing unit. While the vehicle 10 is running, each time the processor 23 receives an image from the camera 2, the processor 23 executes a division line detection process for the received image. Further, the processor 23 controls the vehicle 10 in such a way as to automatically drive the vehicle 10 on the basis of a lane division line detected from the received image.

Figure 3:
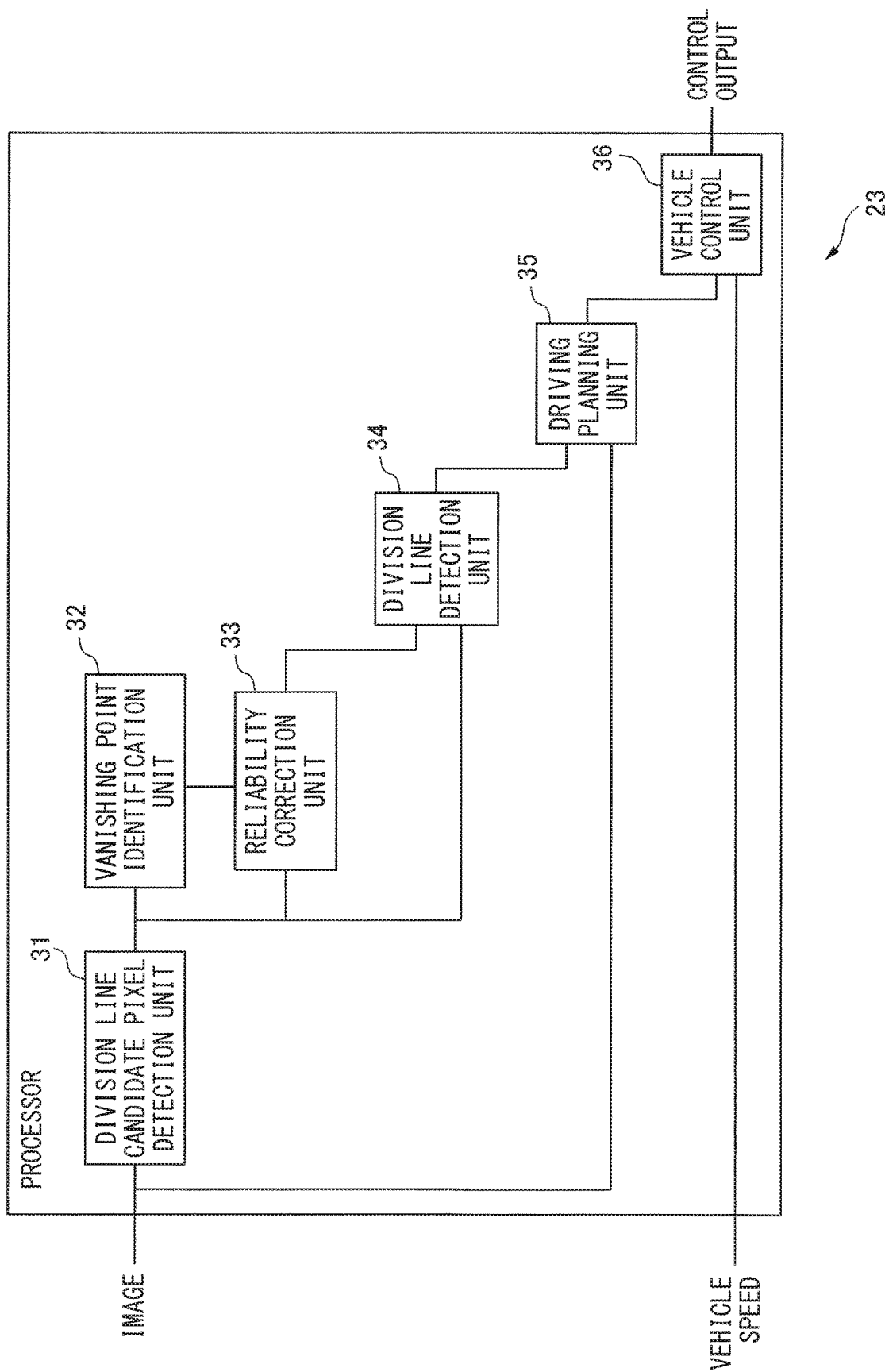
FIG. 3 is a functional block diagram of a processor of the electronic control unit, relating to a vehicle control process including an division line detection process.

FIG. 3 is a functional block diagram of the processor 23 of the ECU 4, relating to a vehicle control process including the division line detection process. The processor 23 includes a division line candidate pixel detection unit 31, a vanishing point identification unit 32, a reliability correction unit 33, a division line detection unit 34, a driving planning unit 35, and a vehicle control unit 36. Each of these units owned by the processor 23 is, for example, a function module implemented by a computer program operating on the processor 23. Alternatively, each of these units owned by the processor 23 may be a dedicated arithmetic circuit provided in the processor 23. Among the respective units owned by the processor 23, the division line candidate pixel detection unit 31, the vanishing point identification unit 32, the reliability correction unit 33, and the division line detection unit 34 execute the division line detection process. Each time an image is acquired from the camera 2, the processor 23 executes the division line detection process for the image. Thus, the process for one image is described below with regard to the division line candidate pixel detection unit 31, the vanishing point identification unit 32, the reliability correction unit 33, and the division line detection unit 34.

The division line candidate pixel detection unit 31 detects a division line candidate pixel from an image generated by the camera 2. The division line candidate pixel detection unit 31 sets reliability representing likelihood that a division line is represented, for each detected division line candidate pixel.

For example, by inputting an image to a classifier, the division line candidate pixel detection unit 31 detects a division line candidate pixel represented in the image. For example, the division line candidate pixel detection unit 31 can use, as the classifier, a classifier for segmentation previously learned in such a way as to output, from an input image, for each pixel of the image, a confidence representing likelihood that the objected is represented in the pixel, for each type of an object having a possibility of being represented on the pixel, and to determine that the type of the object whose confidence is maximum is represented. It should be noted that a confidence regarding a division line candidate pixel is one example of a value representing likelihood that a lane division line is represented. As such a classifier, the division line candidate pixel detection unit 31 can use a Deep Neural Network (DNN) having a Convolutional Neural Network (CNN) architecture for segmentation, such as a Fully Convolutional Network (FCN). Alternatively, the division line candidate pixel detection unit 31 may utilize a classifier for segmentation in accordance with some other machine learning scheme utilizing a Random Forest or a Markov Random Field such as a Conditional Random Field.

When a division line candidate pixel is detected, the division line candidate pixel detection unit 31 sets, for the image, a plurality of scan lines (second scan lines) along a direction assumed to cross a lane division line. For example, the division line candidate pixel detection unit 31 sets a plurality of scan lines along a horizontal direction on the image. In this instance, the division line candidate pixel detection unit 31 may set a scan line for each pixel position in a vertical direction of the image, or provide an interval of a predetermined number of pixels (e.g., 1 to 5 pixels) between adjacent scan lines. The division line candidate pixel detection unit 31 may set a plurality of scan lines concentrically around a center of the image, i.e., a position on the image corresponding to an optical axis of the camera 2. Alternatively, the division line candidate pixel detection unit 31 may set a plurality of scan lines concentrically around a midpoint at an upper edge of the image. In these cases as well, the division line candidate pixel detection unit 31 may provide an interval of a predetermined number of pixels between adjacent scan lines.

The division line candidate pixel detection unit 31 detects a section having successive division line candidate pixels along each scan line. It should be noted that, when only one division line candidate pixel exists on a scan line as well, the division line candidate pixel detection unit 31 may detect the division line candidate pixel as one section. The division line candidate pixel detection unit 31 obtains length (hereinafter, simply referred to as length of a section) of a section having successive division line candidate pixels along a scan line, as another example of a value representing likelihood that a lane division line is represented regarding the section. The division line candidate pixel detection unit 31 sets reliability of one division line candidate pixel included in a section whose length is equal to or more than a predetermined number (e.g., 3 to 10 pixels), e.g., a division line candidate pixel located at a midpoint of the section, to first reliability that is relatively high reliability. On the other hand, the division line candidate pixel detection unit 31 sets reliability of one division line candidate pixel included in a section whose length is less than the predetermined number, e.g., a division line candidate pixel located at a midpoint of the section, to second reliability that is relatively low reliability.

According to a modification example, the division line candidate pixel detection unit 31 may calculate an average value of absolute values of edge strength at both ends of a section having successive division line candidate pixels along a scan line, as another example of a value representing likelihood that a lane division line is represented regarding the section. When the average value of absolute values of edge strength is equal to or more than a predetermined edge strength threshold value, the division line candidate pixel detection unit 31 may set reliability of a division line candidate pixel included in the section to the first reliability. On the other hand, when the average value of absolute values of edge strength is less than the predetermined edge strength threshold value, the division line candidate pixel detection unit 31 may set reliability of a division line candidate pixel included in the section to the second reliability. In this case, the division line candidate pixel detection unit 31 may calculate the edge strength by applying edge detection filter such as a sobel filter or a prewitt filter.

According to another modification example, when a confidence of a division line candidate pixel output by a classifier that determines whether or not each pixel of an image is a division line candidate pixel is equal to or more than a predetermined confidence threshold value, the division line candidate pixel detection unit 31 may set reliability of the division line candidate pixel to the first reliability. On the other hand, when the confidence of the division line candidate pixel is less than the predetermined confidence threshold value, the division line candidate pixel detection unit 31 may set reliability of the division line candidate pixel to the second reliability.

Furthermore, the division line candidate pixel detection unit 31 may also detect, from an image, another object (e.g., a vehicle, a person, or the like) that may affect running of the vehicle 10 other than a division line candidate pixel, by inputting the image to the classifier, as in the detection of a division line candidate pixel. In this instance, separately from a classifier used to detect a division line candidate pixel, the division line candidate pixel detection unit 31 may use a classifier previously learned in such a way as to detect, from an input image, an object represented on the image. As such a classifier, the division line candidate pixel detection unit 31 can use a DNN having a convolutional neural network type architecture, such as a Single Shot Multibox Detector (SSD) or a Faster R-CNN.

The division line candidate pixel detection unit 31 outputs a position and reliability of each detected division line candidate pixel to the vanishing point identification unit 32, the reliability correction unit 33, and the division line detection unit 34. When detecting an object around the vehicle 10 from an image, the division line candidate pixel detection unit 31 outputs, to the driving planning unit 35, information representing a kind of detected object, and a region in which the object is represented.

The vanishing point identification unit 32 identifies a vanishing point on an image on the basis of division line candidate pixels for which the first reliability is set. In general, a vehicle runs along one lane, and therefore, there is a high possibility that a lane division line exists on each of left and right sides of the vehicle 10. Thus, for each of left and right halves of an image, the vanishing point identification unit 32 detects a straight line where a third predetermined number (e.g., 10 to 20 pixels) or more of division line candidate pixels for which the first reliability is set are located. For example, the vanishing point identification unit 32 may detect such a straight line by executing Hough transform for a set of division line candidate pixels for which the first reliability is set, with regard to each of left and right halves of an image. In this instance, with regard to a straight line of interest, the vanishing point identification unit 32 may determine a division line candidate pixel whose distance from the straight line is less than or equal to a predetermined distance (e.g., 1 to 3 pixels), as the division line candidate pixel located on the straight line.

There is a high possibility that a straight line detected from the right half of the image represents a lane division line existing on a right side of the vehicle 10. Similarly, there is a high possibility that a straight line detected from the left half of the image represents a lane division line existing on a left side of the vehicle 10. Therefore, there is a high possibility that the respective detected straight lines are straight lines parallel to each other in a real space. Thus, the vanishing point identification unit 32 identifies, as a vanishing point on the image, an intersection of the straight line detected from the right half of the image and the straight line detected from the left half of the image.

It should be noted that, when three or more straight lines are detected, the vanishing point identification unit 32 may select two straight lines in order in an ascending order of distance from a center of the image, and determine an intersection of the selected two straight lines as a vanishing point on the image. This is because a straight line at a closer distance from a center of an image has a higher possibility of being a lane division line representing a boundary of a lane on which the vehicle 10 is running.

Alternatively, the vanishing point identification unit 32 may select two straight lines in a descending order of a number of located division line candidate pixels for which the first reliability is set, and determine an intersection of the selected two straight lines as a vanishing point on the image.

Furthermore, in general, a position of a vanishing point on an image does not change much among images acquired successively in a time series manner. Thus, the vanishing point identification unit 32 may identify a vanishing point on an image in accordance with one of the above-described schemes every certain period longer than a photography period by the camera 2. In this case, with regard to an image from which a vanishing point cannot be identified, the vanishing point identification unit 32 may determine a position of a vanishing point on another image identified last, as a position of a vanishing point on the image. Alternatively, the vanishing point identification unit 32 may identify, for each of a plurality of images acquired in a most recent predetermined period, a vanishing point in accordance with the above-described scheme, and determine, as a position of a vanishing point in a latest image, an average value of positions of vanishing points identified with regard to the respective images.

The vanishing point identification unit 32 notifies the reliability correction unit 33 of a position of a vanishing point on an image.

The reliability correction unit 33 sets, radially from a vanishing point on an image, a plurality of scan lines (first scan lines) each having one end at the vanishing point, and counts, for each of the scan lines, a number of division line candidate pixels located on the scan line. In this instance, the reliability correction unit 33 may determine a division line candidate pixel at a predetermined distance (e.g., 1 to 3 pixels) or less from a scan line, as a division line candidate pixel located on the scan line. With regard to each scan line whose number of division line candidate pixels is equal to or more than a first predetermined number (e.g., 5 to 20), the reliability correction unit 33 corrects reliability of a division line candidate pixel which is located on the scan line and for which the second reliability is set, from the second reliability to the first reliability.

There is a high possibility that a lane division line is represented on an image in such a way as to have one end at a vanishing point. Thus, as described above, when a large number of division line candidate pixels exist on a scan line having one end at a vanishing point, there is a high possibility that the scan line is a lane division line. Thus, as described above, with regard to a scan line whose number of located division line candidate pixels is equal to or more than a predetermined number, the reliability correction unit 33 corrects reliability of a division line candidate pixel located on the scan line to the first reliability, and thereby, can suitably evaluate reliability of the division line candidate pixel.

The reliability correction unit 33 notifies the division line detection unit 34 of a position of the division line candidate pixel whose reliability is corrected.

On the basis of a set of division line candidate pixels for which the first reliability is set, the division line detection unit 34 detects a lane division line represented on an image. For example, the division line detection unit 34 detects a straight line where a second predetermined number (e.g., 5 to 20) or more of division line candidate pixels for which the first reliability is set are located, by executing Hough transform for the set of division line candidate pixels for which the first reliability is set, and determines the detected straight line as a lane division line. It should be noted that the division line detection unit 34 may determine a division line candidate pixel at a predetermined distance (e.g., 1 to 3 pixels) or less from a straight line of interest as a division line candidate pixel located on the straight line of interest. In this instance, among straight lines where a predetermined number or more of division line candidate pixels for which the first reliability is set are located, the division line detection unit 34 may detect, as a lane division line, only a straight line having one end located within a predetermined distance (e.g., 5 to 10 pixels) or less from a vanishing point on an image. Alternatively, among a plurality of scan lines set radially from a vanishing point, the division line detection unit 34 may detect, as a lane division line, a scan line where a predetermined number or more of division line candidate pixels for which the first reliability is set are located.

Figure 4A:
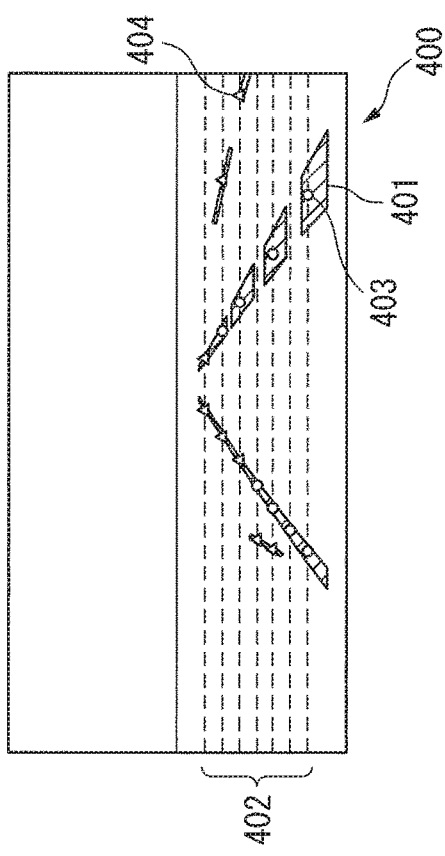
FIG. 4A is a diagram explaining an outline of the division line detection process.
Figure 4B:
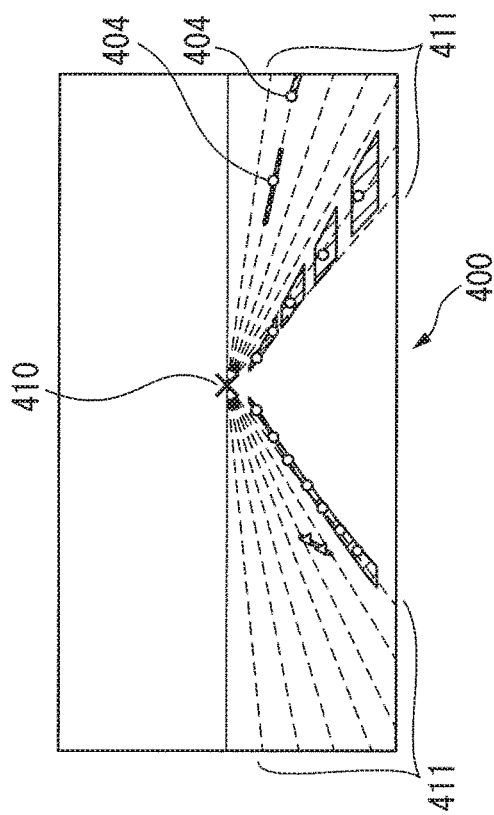
FIG. 4B is a diagram explaining an outline of the division line detection process.
Figure 4C:
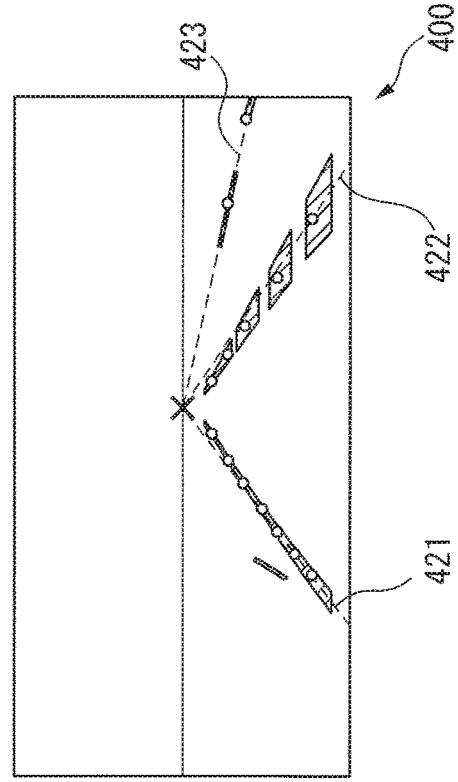
FIG. 4C is a diagram explaining an outline of the division line detection process.

FIGS. 4A to 4C are diagrams explaining an outline of the division line detection process. In an image 400 illustrated in FIG. 4A, individual blocks 401 indicated by hatching each represent a set of division line candidate pixels. In the image 400, a plurality of scan lines 402 are set in a horizontal direction, and with regard to a section where each scan line crosses the block, reliability is set according to length of the section. In other words, with regard to a block whose length of a section along the scan lines 402 is equal to or more than predetermined length among the respective blocks 401, the first reliability is set for a pixel 403 that locates at a midpoint of the section. On the other hand, with regard to a block whose length of a section along the scan lines 402 is less than predetermined length, the second reliability is set for a pixel 404 that locates at a midpoint of the section.

As illustrated in FIG. 4B, after reliability is once set, a plurality of scan lines 411 each having one end at a vanishing point 410 are set on the image 400. With regard to a scan line whose number of division line candidate pixels on the scan line is equal to or more than the first predetermined number among the scan lines 411, reliability of the pixel 404 located on the scan line is corrected from the second reliability to the first reliability.

As illustrated in FIG. 4C, in the image 400, each of straight lines 421 to 423 where a second predetermined number or more of division line candidate pixels for which the first reliability is set are located is detected as a lane division line.

The division line detection unit 34 notifies the driving planning unit 35 of information representing the detected lane division line.

The driving planning unit 35 generates one or more trajectories to be traveled for the vehicle 10 in such a way that another object detected from an image and existing around the vehicle 10 does not collide with the vehicle 10. The trajectories to be traveled are represented, for example, as a set of target positions for the vehicle 10 at the respective times from the current time to a certain time later. For example, the driving planning unit 35 determines that the vehicle 10 is running on a lane identified by two lane division lines located adjacent to each other across the vehicle 10. Further, the driving planning unit 35 determines that another object detected from an image is running on a lane identified by two lane division lines located adjacent to each other across a central position of the another object in a horizontal direction. Then the driving planning unit 35 may determine whether or not the lane on which the vehicle 10 is running is the same as the lane on which the another object is running.

Each time the driving planning unit 35 receives an image from the camera 2, the driving planning unit 35 transforms the received image into a bird's eye image by executing the viewing transformation process using information such as a position of attachment of the camera 2 to the vehicle 10. The driving planning unit 35 tracks, by executing the tracking process using a Kalman filter or the like for a series of bird's eye images, a detected object with regard to each image, and estimates, from the pass obtained from the tracking result, a trajectory of each object up to a certain time later.

On the basis of the detected lane on which another object is running, and the estimated trajectory of the another object, the driving planning unit 35 generates a trajectory to be traveled for the vehicle 10 in such a way that the another object and the vehicle 10 run on different lanes or a relative distance from the vehicle 10 to the another object is equal to or more than a certain distance. In this instance, for example, with reference to current position information of the vehicle 10 acquired from the positioning information receiver 3, and map information stored in the memory 22, the driving planning unit 35 may confirm a number of lanes on which the vehicle 10 can run. When a plurality of lanes on which the vehicle 10 can run exist, the driving planning unit 35 may generate the trajectory to be traveled in such a way that the vehicle 10 may change the lane on which the vehicle 10 runs.

It should be noted that the driving planning unit 35 may generate a plurality of trajectories to be traveled. In this case, among the plurality of trajectories to be traveled, the driving planning unit 35 may select a route in which the sum of absolute values of accelerations of the vehicle 10 is minimum.

The driving planning unit 35 notifies the vehicle control unit 36 of the generated trajectory to be traveled.

The vehicle control unit 36 controls each unit of the vehicle 10 in such a way that the vehicle 10 runs along the trajectory to be traveled that has been notified of. For example, the vehicle control unit 36 calculates a target acceleration of the vehicle 10 in accordance with the informed trajectory to be traveled and a current speed of the vehicle 10 measured by a vehicle speed sensor (not illustrated), and sets an accelerator position or a braking pedal position in such a way as to achieve the target acceleration. The vehicle control unit 36 then calculates an amount of fuel consumption in accordance with the set accelerator position, and outputs a control signal corresponding to the amount of fuel consumption to a fuel injection device of an engine of the vehicle 10. Alternatively, the vehicle control unit 36 outputs a control signal corresponding to the set braking pedal position to a brake of the vehicle 10.

Furthermore, when the vehicle 10 changes its course in order to travel along the trajectory to be traveled, the vehicle control unit 36 calculates a target steering angle for the vehicle 10 in accordance with the trajectory to be traveled, and outputs a control signal corresponding to the target steering angle to an actuator (not illustrated) that controls a steering wheel of the vehicle 10.

FIG. 5 is an operation flowchart of the vehicle control process including the division line detection process executed by the processor 23. Each time the processor 23 receives an image from the camera 2, the processor 23 executes the vehicle control process in accordance with the operation flowchart illustrated in FIG. 5. It should be noted that in the operation flowchart presented below, processing steps from step S101 to step S105 corresponds to division line detection process.

The division line candidate pixel detection unit 31 of the processor 23 detects a division line candidate pixel from an image acquired by the camera 2 (step S101). Further, for each of a plurality of scan lines set along a direction assumed to cross a lane division line, the division line candidate pixel detection unit 31 sets the first reliability for one pixel in a section having a predetermined number or more of successive division line candidate pixels on the scan line, and sets the second reliability for one pixel in a section having less than a predetermined number of successive division line candidate pixels on the scan line (step S102).

The vanishing point identification unit 32 of the processor 23 detects two or more straight lines where a third predetermined number or more of division line candidate pixels for which the first reliability is set are located, and identifies an intersection of the detected straight lines as a vanishing point on the image (step S103).

The reliability correction unit 33 of the processor 23 sets a plurality of scan lines each having one end at the vanishing point radially from the vanishing point. The reliability correction unit 33 corrects, from the second reliability to the first reliability, reliability of a division line candidate pixel which is located on a scan line whose number of division line candidate pixels located on the scan line is equal to or more than the first predetermined number among the respective scan lines, and for which the second reliability is set (step S104).

The division line detection unit 34 of the processor 23 detects, as a lane division line, a straight line where a second predetermined number or more of the division line candidate pixels for which the first reliability is set are located (step S105).

The driving planning unit 35 of the processor 23 identifies a lane on which the vehicle 10 is running according to the lane division line detected from the image, and generates a trajectory to be traveled for the vehicle 10 on the basis of the identified lane (step S106). The vehicle control unit 36 of the processor 23 controls the vehicle 10 in such a way that the vehicle 10 runs along the trajectory to be traveled (step S107). Then the processor 23 ends the vehicle control process.

As has been described above, among division line candidate pixels which are detected from an image generated by a camera mounted on a vehicle and for which relatively low second reliability is set, the division line detection device corrects reliability of the division line candidate pixel located on a scan line having one end at a vanishing point of an image, to relatively high first reliability when a predetermined number or more of division line candidate pixels are located on the scan line. Then, the division line detection device detects, as a lane division line, a straight line where a predetermined number or more of division line candidate pixels having the first reliability are arranged. In this way, reliability is also corrected to high reliability with regard to a division line candidate pixel whose reliability is set to be low because a lane division line appears small on an image even though the lane division line is actually represented. Thus, the division line detection device can detect a lane division line appearing small on an image. Therefore, the division line detection device can improve accuracy in detection of a lane division line marked on a road.

Furthermore, a computer program that implements a function of each unit of the processor 23 of the division line detection device according to the above-described embodiment or modification example may be provided in a form of being recorded in a computer-readable portable recording medium such as a semiconductor memory, a magnetic recording medium, or an optical recording medium.

As described above, those skilled in the art may make various changes in conformity to an embodiment within the scope of the present invention.

What is claimed is:

1. A division line detection device comprising:
    a processor configured to:
        detect division line candidate pixels having a possibility of representing a lane division line from an image acquired by a camera mounted on a vehicle;
        set first reliability for a division line candidate pixel in which a value representing likelihood that a lane division line is represented is equal to or more than a predetermined threshold value among the division line candidate pixels;
        set second reliability lower than the first reliability for a division line candidate pixel in which the value is less than the predetermined threshold value among the division line candidate pixels;
        correct to the first reliability, when a first predetermined number or more of the division line candidate pixels are located on a first scan line having one end at a vanishing point of the image, reliability of the division line candidate pixels on the first scan line for which the second reliability is set; and
        detect, as a lane division line, a straight line where a second predetermined number or more of the division line candidate pixels for which the first reliability is set are located.

2. The division line detection device according to claim 1, wherein, for each of a plurality of second scan lines set along a direction assumed to cross the lane division line on the image, the processor calculates a number of successive division line candidate pixels along the second scan line, as the value representing the likelihood for a set of the successive division line candidate pixels.

3. The division line detection device according to claim 1, wherein the processor is further configured to detect a plurality of straight lines where a third predetermined number or more of the division line candidate pixels which are detected by the processor and for which the first reliability is set are located, and determine, as the vanishing point, an intersection of the detected plurality of straight lines.

4. The division line detection device according to claim 3, wherein the processor determines, as the vanishing point, an average of an intersection of the plurality of straight lines, and a vanishing point detected with regard to an image previously acquired by the camera.

5. A division line detection method comprising:
    detecting division line candidate pixels having a possibility of representing a lane division line from an image acquired by a camera mounted on a vehicle;
    setting first reliability for a division line candidate pixel in which a value representing likelihood that a lane division line is represented is equal to or more than a predetermined threshold value among the division line candidate pixels;
    setting second reliability lower than the first reliability for a division line candidate pixel in which the value is less than the predetermined threshold value among the division line candidate pixels;
    correcting, when a first predetermined number or more of the division line candidate pixels are located on a first scan line having one end at a vanishing point of the image, to the first reliability, reliability of the division line candidate pixels on the first scan line for which the second reliability is set; and detecting, as a lane division line, a straight line where a second predetermined number or more of the division line candidate pixels for which the first reliability is set are located.

\* \* \* \* \*